United States Patent [19]

Chatterjea

[11] Patent Number: 4,644,968
[45] Date of Patent: Feb. 24, 1987

[54] MASTER CLUTCH PRESSURE AND LUBRICATION VALVE

[75] Inventor: Probir K. Chatterjea, Mount Prospect, Ill.

[73] Assignee: J. I. Case Company, Racine, Wis.

[21] Appl. No.: 527,603

[22] Filed: Aug. 29, 1983

[51] Int. Cl.⁴ ............................................. F16K 31/12
[52] U.S. Cl. ................................ 137/599.2; 192/3.57; 192/113 B
[58] Field of Search ............ 192/113 B, 85 AA, 3.57; 137/599.2

[56] References Cited

U.S. PATENT DOCUMENTS

| | | | |
|---|---|---|---|
| 2,935,999 | 5/1960 | Hock et al. | 137/468 |
| 3,033,333 | 5/1962 | Breting et al. | 192/4 |
| 3,125,201 | 3/1964 | Fisher | 192/4 |
| 3,139,908 | 7/1964 | Strader | 192/113 B |
| 3,181,385 | 5/1965 | Siler | 74/364 |
| 3,292,751 | 12/1966 | McRay et al. | 192/3.57 |
| 3,351,169 | 11/1967 | McIndoe | 192/113 B |
| 3,352,392 | 11/1967 | Black et al. | 192/3.5 |
| 3,391,767 | 7/1968 | Stow | 192/113 B |
| 3,444,968 | 5/1969 | Golan et al. | 192/4 |
| 3,498,150 | 3/1970 | Funk | 74/331 |
| 3,583,422 | 6/1971 | Dach et al. | 137/116.3 |
| 3,618,424 | 11/1971 | Golan et al. | 74/753 |
| 3,651,904 | 3/1972 | Snoy et al. | 192/113 B |
| 3,857,302 | 12/1974 | Morris | 192/3.57 |
| 3,882,738 | 5/1975 | Audiffred, Jr. et al. | 74/753 |
| 3,927,690 | 12/1975 | Agren | 137/599.2 |
| 3,991,865 | 11/1976 | Komatsu | 192/109 F |
| 3,998,111 | 12/1976 | Blake | 74/752 C |
| 4,000,795 | 1/1977 | Patton | 192/109 F |
| 4,006,805 | 2/1977 | Zeller et al. | 192/113 B |
| 4,015,619 | 4/1977 | Shore et al. | 137/102 |
| 4,046,162 | 9/1977 | Rodeghiero | 137/489 |
| 4,134,483 | 1/1979 | Horsch | 192/113 B |
| 4,216,851 | 8/1980 | Chatterjea | 192/4 A |
| 4,271,937 | 6/1981 | Hatch et al. | 192/113 B |
| 4,287,813 | 9/1981 | Chatterjea et al. | 91/434 |
| 4,438,049 | 3/1984 | Ammon | 137/599.2 |

Primary Examiner—Samuel Scott
Assistant Examiner—H. A. Odar
Attorney, Agent, or Firm—Cullen, Sloman, Cantor, Grauer, Scott & Rutherford

[57] ABSTRACT

Master clutch pressure and lubrication valve which consolidates both such functions or services for a power operated clutch pack, all to insure the necessary conservation of cooling lubrication oil at times when full engagement pressure on the clutch pack can have stabilized it against further clutch slip, but at times otherwise to insure a liberal flow of the cooling oil. By built-in delay of cooling flow change following clutch actuation in the valve, it makes the transition between the two rates of cooling flow by temporarily sustaining liberal circulation of the cooling flow for that initial time after full engagement pressure exerts itself on the clutch pack. Sometimes a clutch will continue slipping, just for that initial time.

1 Claim, 4 Drawing Figures

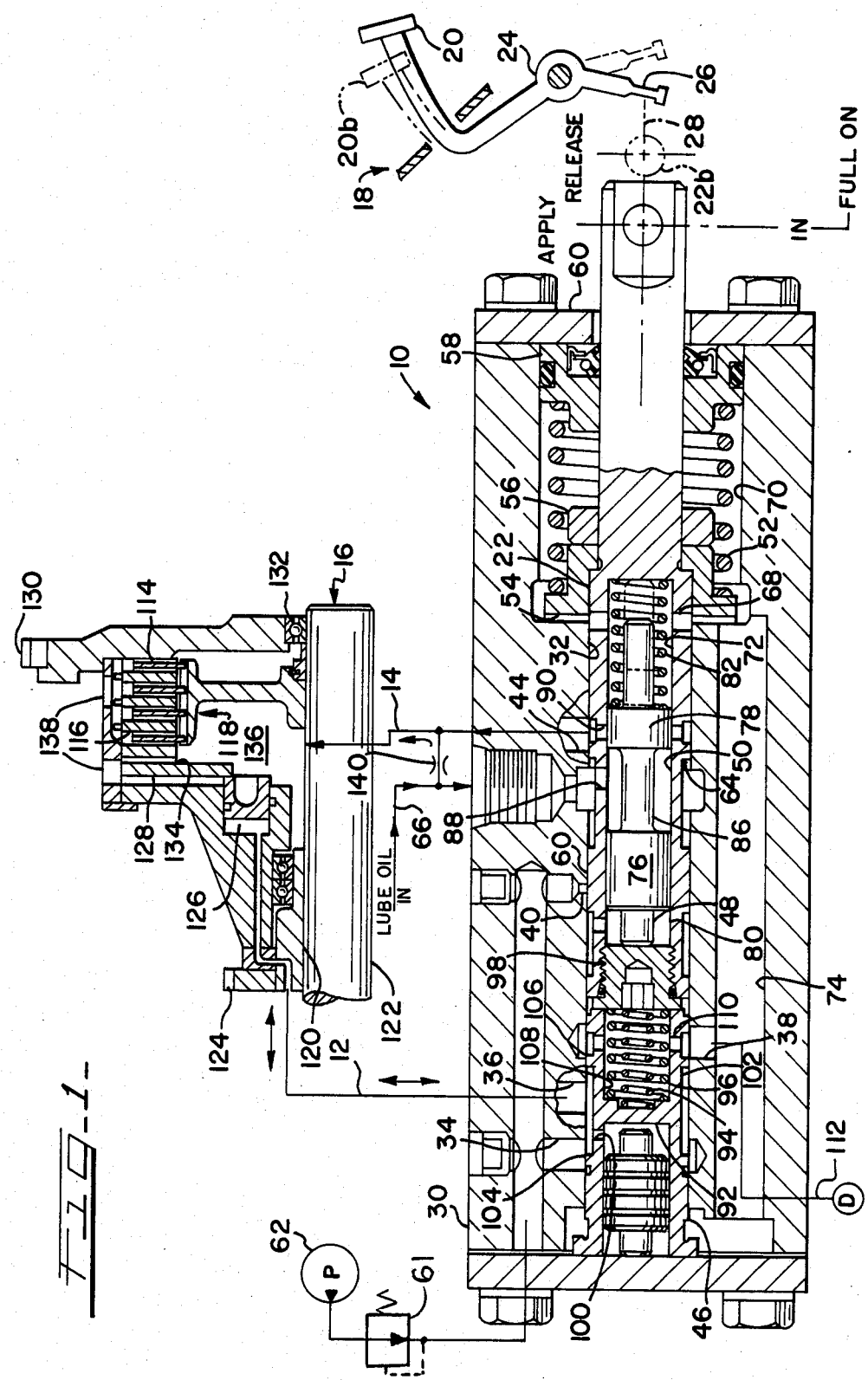

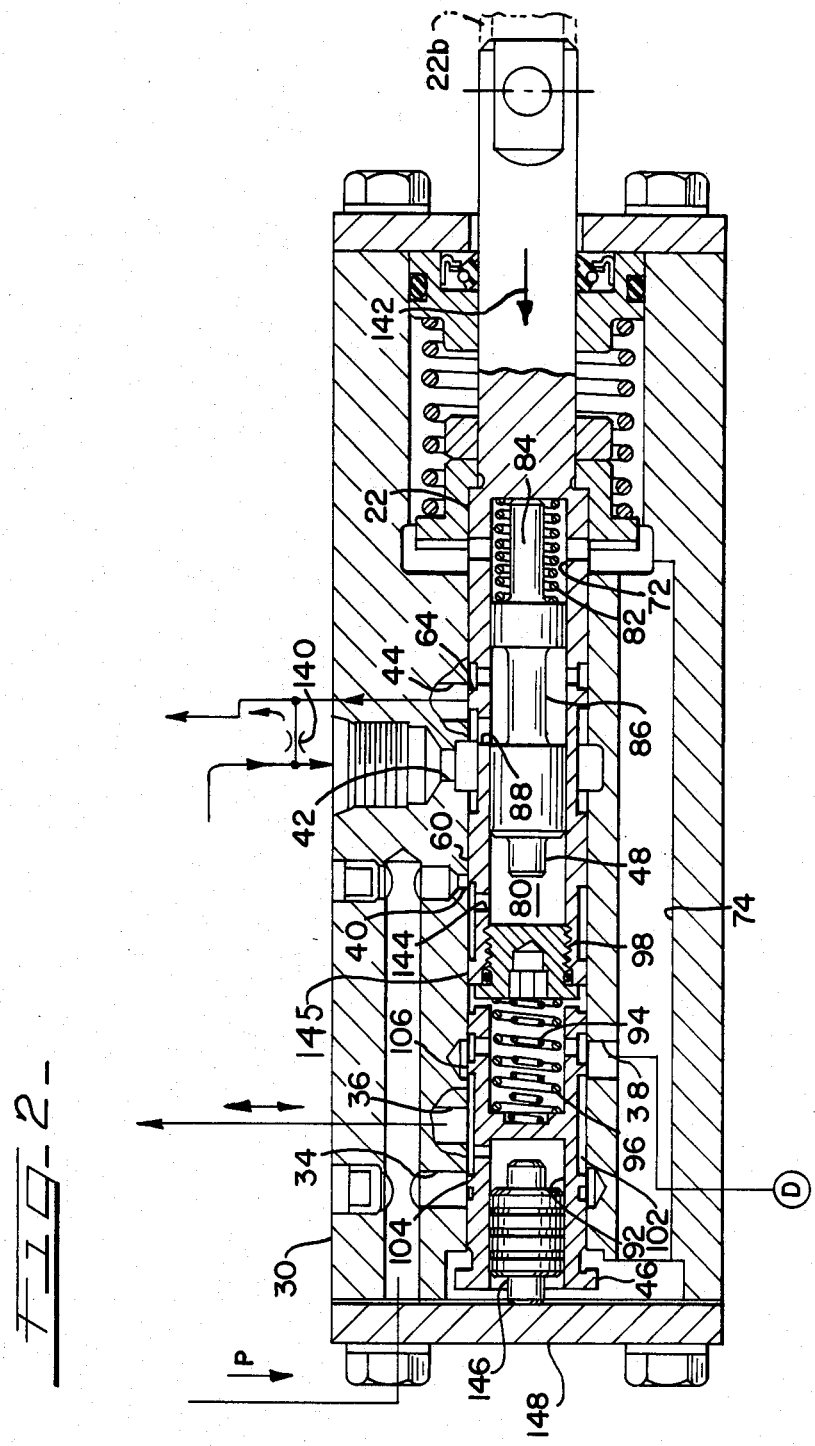

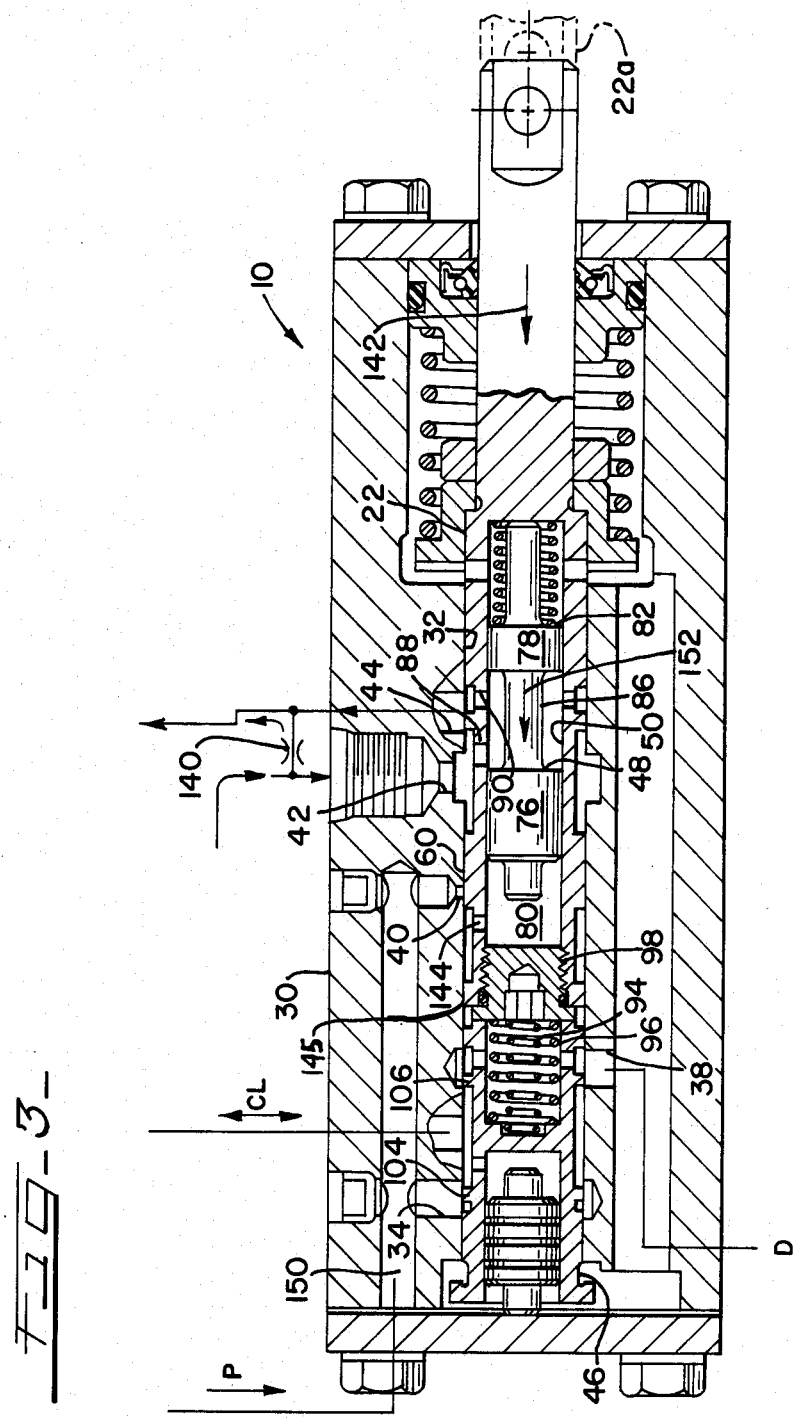

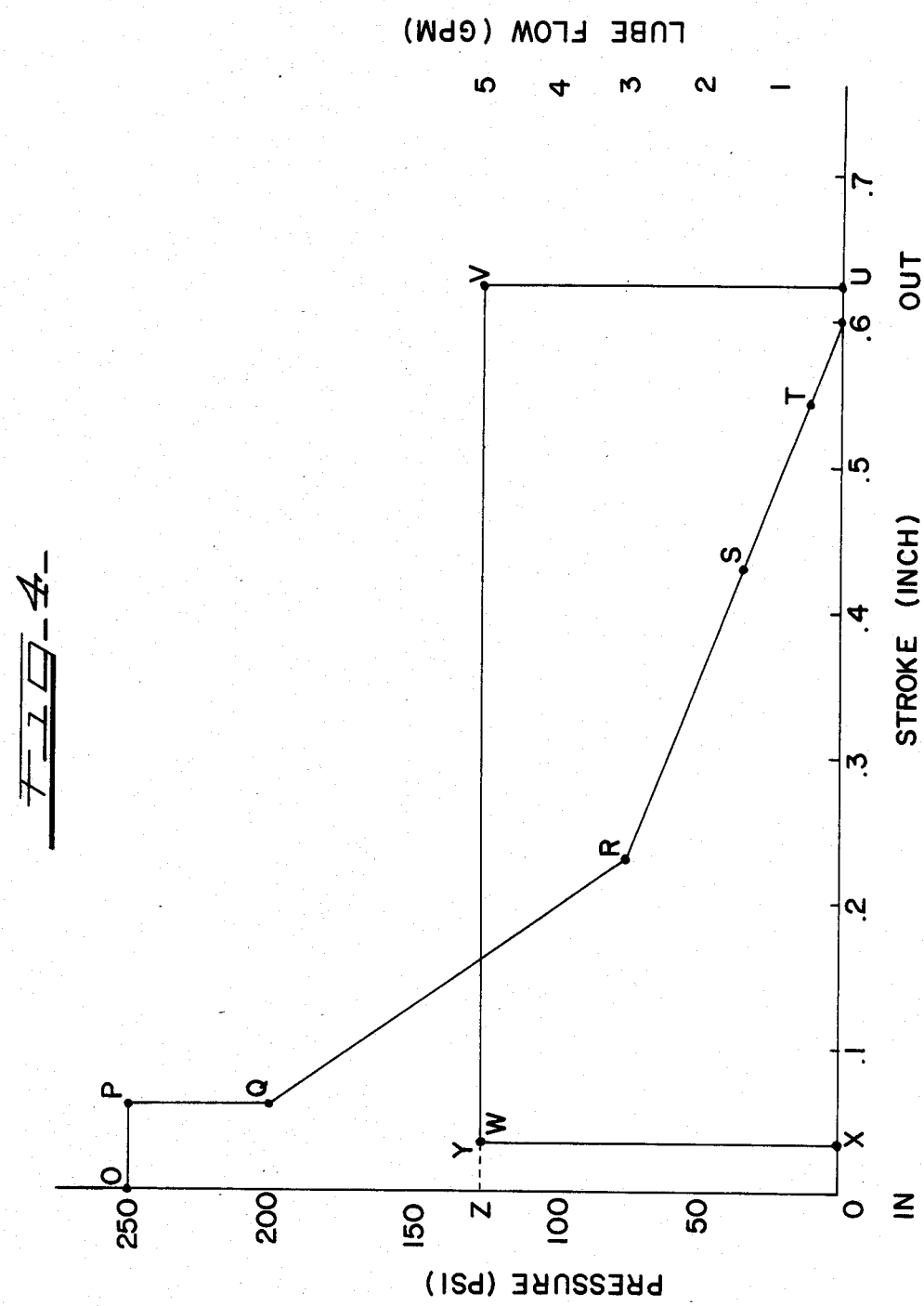

4,644,968

MASTER CLUTCH PRESSURE AND LUBRICATION VALVE

BACKGROUND OF THE INVENTION

The present application relates to a combined pressure control and lubricating valve for an hydraulically actuated friction engageable member such as is in transmission and brake mechanisms. It relates more particularly to a master clutch pressure and lubrication valve consolidating both such functions or services necessary for the power operated clutch, which clutch generally comprises a disc or plate pack that frictionally engages or disengages to control drive transmitted through a transmission as provided in tractor vehicles and other vehicles.

As background thereto, the material information includes but is not limited to U.S. Pat. Nos. 2,935,999, 3,125,201, 3,181,385, 3,352,392, 3,444,968, 3,498,150, 3,033,333, 3,583,422, 3,618,424, 3,882,738, 3,991,865, 3,998,111, 4,000,795, 4,015,619, 4,046,162, 4,216,851, 4,287,813, and especially U.S. Pat. No. 4,134,483 which was formerly assigned to the assignee hereof.

Power clutches and specifically hydraulic-power-clutches which receive their actuation control from a clutch pressure device and receive their cooling from a lubrication control device are in general use. Coordination between the two devices is required and similarly the provision of all required separate lines and connections, all in the effort to insure the necessary consersation of cooling lubrication oil at times when the clutch pack can have stabilized against further clutch slip, but at times otherwise to insure a liberal flow of the cooling oil. The physical separation of the devices is of course accommodated in actual practice, but involves interconnection and separate connection problems and other problems.

SUMMARY OF THE INVENTION

In accordance with my invention, a valve structure, consolidates control and lubrication functions in one and materially reduces or substantially eliminates the foregoing problems. In addition, the instant structure offers a significant advantage, by built-in delay in the valve, of affording and temporarily sustaining liberal circulation of the cooling flow for a time after it directs full engagement pressure in the clutch pack; not uncommonly a clutch pack being loaded under heavy torque will continue slippage if only momentarily, thus generating heat which accumulates and can prove damaging unless the liberal flow is sustained constantly cooling down the pack during the short period involved.

DESCRIPTION OF THE DRAWINGS

Various features, objects, and advantages will either be specifically pointed out or become apparent when, for a better understanding of my invention, reference is made to the following description taken in conjunction with the accompanying drawings, which show a preferred embodiment thereof and in which:

FIG. 1 is a longitudinal sectional view, in left side elevation, of a pedal-operated, hydraulically actuated and cooled vehicle clutch having an interposed single-control type valve therefor embodying the present invention;

FIGS. 2 and 3 are of the valve only, viewed similarly therein but in other operating positions from FIG. 1; and FIG. 4 is a graph of both actuation pressure plotted against and flow rate through valve plotted against valve position as measured along the inches of its stroke.

DESCRIPTION OF THE PREFERRED EMBODIMENT

More particularly in FIG. 1 of the drawings, a combined clutch valve 10 embodying the single-control which I provide is shown including clutch service and lubrication lines 12 and 14 each separately connected to the master transmission clutch 16 of a vehicle 18 such as agricultural and other off-the-road tractors. The clutch 16 responds indirectly to an operator's clutch pedal 20, through the intermediary of my single-controlling, load plunger valve 22, for supplying the clutch with cooling fluid and also pressure fluid to control clutch slip in the transmission or establish full engagement or disengagement therein.

In more specific detail in the foot clutch mechanism, effective as it is in establishing oil flow rate and pressure level set in the clutch, the pedal 20 thereof forms one of the arms of a bellcrank 24 secured on a fixed pivot below the operator's compartment of the vehicle 18. A depending bellcrank arm 26 is controlled in regular way at its outer end by a return spring, not shown, and controls clutch linkage which, in simplified showing, appears schematically at 28 and is clevis-connected to pull on the load plunger valve 22 in its operation thereof.

The unitary housing of valve 10 consists of a one-piece casing 30 formed with a central longitudinal bore 32 having, spaced apart along its length, a communicating pressure port 34, inlet-outlet port 36, drain port 38, restricted port 40, orificed port 42, and lubrication port 44. Reciprocally mounted in the bore are, at one end, the controlling plunger valve 22 and the two other principal moving parts consisting of a controlled spring biased metering valve spool 46 in the inner end of the bore and a controlled captive spring biased shuttle delay valve 48 telescopically and concentrically mounted in the hollow interior 50 of plunger valve 22. The controlled metering spool 46 and shuttle valve 48 are illustrated in their clutch-apply position, as determined by the controlling plunger valve taking its corresponding clutch-apply position, with results now to be explained.

APPLY POSITION—FIG. 1

In this position as FIG. 1 shows, the plunger valve 22 is held in by a return spring 52 having a radially slotted spring perch 54 at one end engaging a shoulder on valve 22. A spacer 56 on the valve stem forms an outward limiting stop within spring 52 which, at its opposite stationary end, has a spring seat 58 sealed to the stem, and also sealed to and plugging the outer end of the valve bore 32. A casing end plate 60, when bolted in place as illustrated, holds the seat 58 in place to take the compressive reaction from the end of spring 52.

The plunger valve 22 has an inner land 60 in the bore 32 blocking therefrom the restricted port 40 which, along with the spaced apart pressure port 34, is constantly supplied with regulated pressure P through regulating valve 61 from an engine-driven pump 62 on the vehicle. The valve 22 has also an intermediate narrow land 64 in the bore blocking the orificed port 42 from transmitting lubrication oil from a cooling oil supply 66 on the vehicle to the lubrication port 44. The slotted perch 54 and a registering radial port 68 in the valve 22 maintain open communication between a return spring chamber 70 in the outer end of casing 30 and the spring chamber 72 of the spring biased shuttle valve 48 inside the hollow interior 50 of the plunger valve. The two chambers freely breathe because of an open connection with a longitudinal drain passage 74 in casing 30 leading to its opposite end.

The shuttle valve 48 has a long land 76 in the inner end and a short land 78 in the outer end of the valve hollow interior 50. The interior's inner end and the confronting land 76 define a pressurizable chamber 80, and the outer end and confronting land 78 define the spring chamber 72 occupied not only by the shuttle valve spring 82 but also by a shuttle valve end stop 84 which can be extended with valve movement until it bottoms in the outer end of the hollow interior 50 of the plunger valve.

In the clutch-apply position of outer and inner valves 22 and 48 as illustrated in FIG. 1, the shuttle valve chamber 80 has no activatable pressure in it because plunger valve land 60 blocks pump pressure P therefrom. A shuttle groove 86 confines lubrication pressure L fed from orificed port 42 thereinto through a plunger valve port 88; a delayed-closing plunger valve port 90 is blocked by the short shuttle valve land 78 from communicating the groove fluid with the lubrication line 14. The unopposed bias of spring 82 holds the shuttle valve spool 48 in place. The blocked space 80 at the left end of spool 48 does not build up pressure due to leakage from the pressure port 40 because its leakage potential over land to drain port 38 is many times greater.

The metering valve 46 is not only controlled by a pressure movable end area in a regulating chamber 92 and by a respective long and short, pair of coaxial springs 94 and 96 inside the valve's outer end portion; the valve is also controlled in the apply position illustrated by abutting engagement of its outer end portion with a plug 98 threaded fast into the confronting inner end of the spring held plunger valve 46. In this trapped position of valve 46, and with no effect resulting, it communicates the pressure P from pump port 34 through a valve port 100 into the regulating chamber 92; nor does any effect result from the long and short springs 94 and 96 which are held compressed by the much heavier spring 52 in the valve's outer end portion.

The valve 46 is in an active position, however, because of a groove chamber 102 which is defined by spaced apart valve lands 104 and 106 and which communicates the pressure P from pump port 34 directly into the clutch service line 12. A spring chamber 108 in the valve's outer end portion is enabled by a port 110 to constantly communicate with drain port 38, and the drain port similarly to the drain passage 74 constantly communicates through a common drain line 112 with a drain D. On the other hand, the metering valve land 106 blocks the groove chamber 102 so that the clutch service line 12 and its inlet-outlet port 36 do not drain through port 38 in the valve casing 30.

FIG. 1—FULLY ENGAGED CLUTCH

Under sustained line pressure exerted in the master clutch 16 by combined valve 10 through the service line 12 supplied by the latter, the stacked, alternating inner 114 and outer 116 discs or plates forming a clutch pack 118 are stabilized in slip-free full engagement under final pressure. Specifically, service line pressure fluid transmitted between the manifold 120 about a transmission input shaft 122 in journal bearings therein and the independently rotatable clutch housing 124 is communicated through their passages into a piston and cylinder chamber 126, holding the pressure plate 128 hydraulically so as to compress the pack 118. The reaction is taken by an engine-driven flywheel 130 in which the shaft 122 is piloted by a bearing 132. A radial slot as typified at 134 and adjacent radial slots, not shown, in the face of the inner discs 114 discharge oil from a cooling chamber 136 through radial housing ports 138.

The cooling supply 66 through a secondary bypass restriction 140 provides the sole lubrication oil flow at this time, entering via lubrication line 14 into the chamber 136 and in amount sufficient only for lubricating and for keeping the pack 118 wet, e.g., 2 gallons per minute (gpm or 7.8 l./min.).

The clutch pedal 20 occupies the fully extended position thereof as shown by solid lines, therefore being unactuated.

To reach unactuated position, the pedal undergoes, as from its fully depressed position as shown by the broken lines 20b, a retractive movement by complete removal therefrom of the operator's toe pressure. Such retractive movement, eventuating in the combined valve 10 coming finally to rest in the described position shown in FIG. 1, sends the plunger valve 22 through intermediate transition positions as explained in the descriptions of figures immediately following.

FIG. 2

TRANSITION OF PLUNGER VALVE TOWARD APPLY POSITION

As illustrated in this figure, the plunger valve 22 is being moved inwardly by the operator in the direction of the arrow 142. The plunger intermediate land 64 continues to hold open, the same as it did in the immediately preceding position of plunger valve 22 when the pedal was fully depressed, the lubrication port 44; so both in the valve position appearing and in the one immediately preceding, valve 22 directs lubrication oil in a main cooling path from orificed port 42, via the mentined port 44 and lubrication line 14, thence into the clutch cooling chamber 136, not shown. On basis of the lubrication system design pressure at supply 66, and restriction size at secondary bypass 140, an orifice size at port 42 is selected such that the additional flow in the main cooling path afforded by land 64 can satisfactorily be in the range of 5 to 7 gpm (19 to 27 l./min.) for the particular master clutch described. Obviously, the flow through the permanently open secondary bypass 140 will reduce somewhat.

The valve land 60 which controls the line-pressure-supplied restricted port 40 and a pressure chamber port 144 leading into the valve interior pressure chamber 80, continues open (but only partly so), the same as it was (actually wide open, then) in the immediately preceding position of plunger valve 22 when the pedal was fully depressed. So as desired in common, highly restricted flow at line pressure into the interior chamber 80 holds the shuttle valve 48 positioned as shown, with its end stop 84 bottomed against valve 22 and with the force of opposing spring 82 overcome so that it foreshortens to its collapsed design length in shuttle chamber 72.

Accordingly, the intermediate valve land 64 positioned as shown is starting to open a primary bypass path leading from orificed port 42 and valve port 88 via shuttle groove 86, delayed closing port 90, and lubrication port 44, thence into lubrication line 14 and the clutch cooling chamber. The mentioned additional cooling flow is therefore sustainable for the time from two paths, the main one and a primary bypass path or branch from orificed port 42.

Compared to its full drain effect by the metering valve 46 having its land 104 in fully closed and land 106 in fully open positions when the clutch pedal was fully depressed, the valve 46 when producing its metering effect shown has the land 106 closed to drain and the land 104 affording from the pressure port 34 a restricted flow at a regulated pressure setting. That flow into clutch service line 12 is restricted, solely to make up for regularly encountered slight leaking through the clutch cylinder seals, not shown.

The metering valve 46, controlled as indicated by pressure in the chamber 92 and opposing springs 94 and 96, takes its regulated pressure setting depending upon the force of the springs, increasing the pressure with increasing spring force. In that connection, the chamber 92, fed at 100 with regulated pressure in the hollow outer end of valve 46, slideably receives a chamber plug 146 which is forced by chamber pressure to react with its outer end bottomed against an outer end plate 148 bolted to the valve casing 30.

As the meager gap between the confronting valve plug 98 and metering valve 46 would appear to be suggesting, the latitude being given the later for its metering travel is fast diminishing and rather promptly disappears, as will now be explained.

FIG. 3

TRANSITION OF SHUTTLE VALVE TOWARD APPLY POSITION

The plunger valve 22 with continued inward movement in the direction of arrow 142 appearing in this figure supplements springy contact with valve 46 and comes into solid abutment therewith. Due to shift of the metering valve 46 by such an unyielding connection, its lands 106,104 increase the blocking distance maintained on the already closed drain port 38 and increase the opening of the already open pressure port 34 which is held at the line pressure P through a common longitudinal manifold passage 150 in the valve casing 30.

As the plunger valve 22 is inducing the shifting elsewhere, its own lands 60,64 are readying the shuttle valve 48 to perform its operation. The increasing blocking distance by land 60 between the ports 40 and 144 means that the shuttle valve 48 is projecting into a closed end chamber 80, so that there is no longer live pressure holding the shuttle spring 82 collapsed. The plunger valve land 64 is in predetermined final motion, to divert cooling flow by closing the main cooling flow path from the input of orificed lubrication port 42.

Consequently, the shuttle valve 48 starts affording the valved path, as the primary bypass, of cooling flow leading through the combined valve 10 from orificed port 42 and port 88, via shuttle groove 86, delayed closing port 90, and lubrication port 44, thence into lubrication line 14 to flood the clutch cooling chamber as before. Due to the just noted port 90, the ongoing shuttle valve operation exhibits a change as will now be explained.

FINAL CLUTCH PRESSURE TRANSITION ELIMINATING SLIP

The way this transition occurs in position of the valve parts, specifically from the position as shown in FIG. 3 to the position, ultimately, as shown in FIG. 1, happens when valves 22 and 46 together move without delay in arrow direction 142 (FIG. 3), followed by the valve 48 then moving with delay in arrow direction 152. The former motion is without interruption because the operator will have removed his tow pressure altogether from the clutch pedal 20 illustrated in FIG. 1.

Meanwhile, the unopposed shuttle spring 82 acting in the direction of arrow 152 is slowly forcing the shuttle's loosely slideable long land 76 to displace, from chamber 80, the trapped volume of oil which gradually transfers through the hollow interior 50 in the clearance along the outside of land 76 from the leading face to its trailing face and to drain port 38 over land 145 of plunger 22.

The annular allowance space designed into the fit of the land 76 to the bore of interior 50 is such that, for one set of oil viscosities contemplated, the spring 82 will shift the shuttle through its complete travel in the range of 2 to 8 seconds, preferably after a lapse of about 3 to 5 seconds. Consequently, the shuttle valve land 78 will block off the delayed closing port 90 after that order of a time lapse, stopping the substantial oil flow through orificed port 42 so that lubrication line 14 receives only the diminished cooling rate of flow supplied by the restricted secondary bypass 140 alone.

By lightly applying toe pressure to the clutch pedal, and then slightly varying it, the operator can feather the clutch, thus adjusting the plunger valve only slightly each way from some selected feathering position such as shown in broken lines at 22a in FIG. 3. The result can best be understood graphically from the description of the next figure to follow.

FIG. 4—GRAPH OF PRESSURE/RATE TO STROKE

The arbitrary feathering position just referred to is represented graphically in this figure at point S located on a clutch pressure rise curve which in the pertinent portion thereof is delineated by its consecutive segments from final point O, via the locus of points PQRS, to point T. Point T or thereabout represents, where it occurs in the valve stroke, the plate clearance take-up condition at which the slightest torque is starting to be transmitted by the clutch.

The locus of points UVWX defines the superimposed rate of cooling flow curve, on which the appended horizontal broken line segment YZ represents no stroke measurement but a predetermined interval of time necessary for the temporarily sustained, high original cooling flow during full apply engagement pressure in the clutch in the normal, end-of-stroke position of the valve. The flow represented by VWYZ is steady, at a constant rate of 5 gpm (19 l./min.) as graphed, which in one typical case selected proved a satisfactory rate in practice, and is in addition to the flow supplied through bypass orifice 140.

More particularly, the breakdown of the pressure loading positions of the valve in its stroke consist of first the full apply, engagement control pressure segment OP at a representative steady pressure of 250 psi (1700 kPa), next the designed-in precipitous pressure drop segment PQ occurring instantaneously to transform from the unmodulated range to the modulated control pressure range, then the comparatively rapid, linear rate of pressure drop segment QR in the first part of a modulating range going toward full clutch release, and finally the more gradual, linear pressure-rate-of-drop segment RST at and following which the clutch pack starts to open up plate clearance space, thereafter to reach full release under no torque.

As can be inferred from the location of point S, operators prefer, for close handling in general, to inch along their vehicles under lower pressures for preciseness; the feathering area at such pressures allows large changes in pedal tow travel with only relatively small changes resulting in the light engagement and light torque being applied in the drive line. So beginning at point R, where both springs 94,96 are between and engaged by confronting valves 22,46, a changed condition results as represented by segments RS and ST; although in that condition both the long and short springs 94,96 are between the confronting valves, only the long spring continues to be engaged by the valves and the resulting light spring thrust means the operator's slight toe pressure changes cause considerable valve movement with only slight and sensitive changes in metering pressure.

In contrast to the segment OP in which clutch pressure is held at one level, the segment RST represents that in practice the clutch pressure rises and falls at a desired constant rate, doing so under light control pressure for graduality of engagement and controlled clutch slip during the corresponding portion of valve stroke; whereas, the segment QR indicates a constant higher rate of rising and falling of the modulated clutch pressure with similar increments of valve stroke.

The full release position of the plunger valve, shown by the broken lines 22b appearing in FIGS. 1 and 2, causes the clutch to completely release its engagement and corresponds to the full depressed position of the clutch pedal as shown by the broken lines 20b in FIG. 1. The liberal cooling circulation available to be sustained by the plunger valve in that position can be allowed or not; such circulation can certainly be adjusted out of the operation with reasonable attention being given to a comparison of the valve stroke and pedal stroke during installation, and borders on being immaterial, anyway. At all events, in regard to declutching, it will be apparent that the valve 10 altogether blocks the clutch cylinder chamber 126 from line pressure P, and connects it instead freely to drain D.

A short explanation is perhaps in order for seeming inconsistencies among the times desirable for rates of cooling flow, and substantial differences in those rates.

The reason for liberal cooling circulation, if allowed, when the clutch pack is in freely idling, fully disengaged condition is that the condition occupies such a small proportion of service-time life of the clutch that, so long as there is some flow, its resulting rate does not materially bear on the valve design or adjustment as installed.

Strong reason lies for liberal circulation when clutch engagement and disengagement strokes are taking place, and when the intermediate feathering part-strokes are taking place. The accumulation of friction heat, left unchecked, will produce a continuing, damaging climb in surface temperature of the rubbing friction surfaces which, when flooded with oil in the way described, will nevertheless keep moderately cool as the clutch pack friction plates are undertaking or releasing a torque load.

The diminished flow reason applies during practically all of the service-time life of a performing clutch. The clutch when so performing is always stabilized, fully engaged; so the diminished flow fully suffices to pre-wet the clutch upon engine start-up, and to keep it wet thereafter at all other times of full engagement. Additional flow would not only impede clutch efficiency due to the extra, unnecessary fluid friction drag, but also be wasteful of the unproductive circulation.

Finally, it has been noted that during predetermined final valve inward motion to apply the clutch to full on, the external valve surface on land 64 of the plunger is not only disestablishing the main cooling path directly between ports 42 and 44, FIG. 3; the valve land 64 is also at the time cooperating with shuttle 48 and route points 88,86,90 to establish the primary bypass therethrough, effectively diverting intact, the full flow of the main cooling path. So if the clutch happens to be under a heavy torque load at the instant of full clutch pressure application, the clutch can do some further slipping momentarily before becoming stabilized and there will be no overheating harm done it, because the clutch is exposed to that appreciable amount of cooling oil which continues to flow momentarily. Then when the shuttle bypassing is timed out by dashpotting at 80,76, the face of short control land 78 slides across the internal valve surfaces of delayed-closing port 90, blocking off the valved primary bypass so that the surviving permanently open secondary bypass afforded by restriction 140 is the sole cooling path remaining in operation.

The designed-in interval for shuttle bypassing is hydraulically timed, on basis of the lowest viscosity oil conditions contemplated in service, to last at least as long as the clutch after-slip following full apply pressure. If a heavier oil is used at times in service, and especially with the oil cold, the resulting longer, hydraulically timed closure delay will last at most only a matter of seconds more; so neither will other oil-supplied components in the power train be unnecessarily deprived of adequate lubrication supply nor will there be other detriment to the system for the few seconds of time involved.

In overall view of the foregoing four sets of circumstances, it is to be appreciated that unitary control by plunger operation of the consolidated valve creates a mechanically connected sequence of performances in locked step. Irrespective of whether the plunger valve is being operated into a position corresponding to full clutch release or into a position loading the metering valve, and irrespective of which one of the loading positions the plunger valve happens to be taking, the plunger valve carries permanent external and internal valve surfaces which are coordinately fixing the flow in the valved first cooling passage, or presetting the shuttle valve, or starting the timed interval for delayed closure of the second passage by the shuttle valve while fixing the diverted flow from the first valved passage to that second passage, or cutting the pump load to minimum so that no supplemental flow through the consolidated valve aids the permanently open fixed restriction which is therefore relegated, by operation of the plunger valve at that time, to be the sole surviving cooling passage in operation.

It is to be realized, despite the intricacy of the foregoing, that accomplishing it is done by a total of three principal moving parts including the plunger valve element itself, to wit, valve elements 22,46, and 48. That is, just three parts control three hydraulically parallel clutch cooling paths with selectivity in fixed synchronism with clutch actuation, and control that actuation of the clutch with infinitely variable pressure selectivity within its full-on/full-release range.

It is evident that, in some applications, my invention is equally adaptable to oil cooled, oil actuated brake mechanism in which two or more rates of cooling flow are desirable at precisely coordinated times automatically determined by the phases of braking.

What is claimed is:

1. In an actuating and lubrication valve assembly for a hydraulically actuated clutch including a load spring and adjustable means to meter actuating fluid to the clutch for clutch engagement pressures, the improvement comprising:
   a load plunger valve (22) for compressing the load spring having internal valve surfaces comprising a plunger valve port (88) and a delay plunger valve port (90) and external valve surfaces comprising a land (64) and a lubrication port (44);
   a bore (32) receiving said load plunger valve, and said internal and external valve surfaces defining a first passage through said bore for directing (64) lubrication flow to said clutch only when the load plunger valve is in a loading position to modulate clutch control pressure, said internal and external valve surfaces defining a second passage through said bore which permits intermittent lubrication flow to said clutch (64, 44, 88, 90), and passage blocking means (78) for blocking flow through said second passage to said clutch;
   means (80, 76) for causing an appreciable delay between the time the second passage permits flow to said clutch and the time the second passage is blocked by said passage blocking means;
   said passage blocking means and said delay means comprising a shuttle valve (48) arranged in concentric relationship with the load plunger valve with said shuttle valve being located within said load plunger valve, said shuttle valve including a control face (78) and the control face of said shuttle valve being controlled by a shuttle valve spool and a biasing spring in said bore, and said control face being movable with respect to the internal valve surfaces to block flow or permit flow through the second passage;
   said shuttle valve spool (76) arranged within said load plunger valve with a loose telescopic fit to define an expansible and contractable pressure chamber (80) between said shuttle valve spool and said plunger valve, incoming fluid pressure to said bore expanding said chamber with resulting force being applied against the shuttle valve spool and the shuttle valve spood moving against and overcoming the force of said biasing spring; and
   means (140) defining a permanently open third passage which restrictively directs lubrication flow to said clutch at a continuous but significantly diminished flow rate as compared to the flow rate of lubrication flow to the clutch through said first and second passages.

* * * * *